Nov. 3, 1953 H. EVANS 2,657,680
SAWING MACHINE FOR STONE AND HARD PLASTIC MATERIAL
Filed Aug. 29, 1950 7 Sheets-Sheet 1

INVENTOR.
Harold Evans.
BY
Harris S. Campbell
ATTORNEY

Nov. 3, 1953 H. EVANS 2,657,680
SAWING MACHINE FOR STONE AND HARD PLASTIC MATERIAL
Filed Aug. 29, 1950 7 Sheets-Sheet 3

INVENTOR
Harold Evans
BY
Harris S. Campbell
ATTORNEY

Patented Nov. 3, 1953

2,657,680

UNITED STATES PATENT OFFICE 2,657,680

SAWING MACHINE FOR STONE AND HARD PLASTIC MATERIAL

Harold Evans, Niagara Falls, Ontario, Canada

Application August 29, 1950, Serial No. 182,020

22 Claims. (Cl. 125—14)

This invention relates to improvements in automatic saws suitable for cutting hard materials such as stone and plastic which may be in the form of sheets or blocks. The invention is particularly concerned with improvements in the saw structure and its controls and in accessory mechanisms associated with saw structure.

The present invention has as its primary object the provision of structure and mechanism for increasing the ease of handling heavy stone or plastic material for permitting it to be quickly and accurately set in position for cutting and for improving the efficiency of the cutting operation.

An important object of the invention is the arrangement of the various controls so that a single operator may perform all operations associated with the complete cycle required in the cutting operation from a central position at the front side of the machine.

It is also an object to provide improved back-square mechanism which may be accurately set from the front to give the desired width of cut.

Another object of the invention is to provide an improved clamping mechanism for retaining the work securely in position during the cutting operations. This clamping mechanism is operated from the normal operator's position by power means and includes mechanism which provides for accommodating material having an uneven surface while still giving effective clamping action, evenly distributed to all points.

A further object of the invention is the provision of an improved driving and controlling system for actuating the saw movement during its cycle of operation, particularly with respect to control of the speed of forward and return traversing movement of the saw carriage.

Another object of the invention is the provision of a control system which allows the operator to provide for automatic operation either through one complete cycle or for continuous cutting through several cycles.

An additional object of the invention is the provision of a control system for the traversing action of the saw in which the return motion may be controlled to give either high speed motion or slow speed cutting motion.

Heretofore in machines of this type, after a slab has been cut off, it has been necessary for the operator to move to the back of the machine for removal of the slab from the supporting table. It is an object of the present invention to provide an automatic unloading device to remove the cut slab from the work table during the return motion of the saw. This feature permits the operator to immediately move the material into position for the next cut as soon as the saw has returned to the starting position.

How the foregoing and other objects and advantages of the invention may be accomplished will be clear from the following description of the drawings, in which—

Referring to Figures 1 to 4, it will be seen that the saw unit 15 is supported on the large transverse beam 16 which in turn is supported in position by the pedestal 17 at one end and the frame structure composed of uprights 18 and transverse beam 18a at the other end. The main beam 16 incorporates lower flanges 19 (see Figure 3) which serve as rails to permit the saw unit 15 to move along the beam 16 during the sawing operation. The saw blade 20 is mounted on an arbor 21 and is driven by means of an electric motor 22 which is held in the frame unit 23.

Figure 10:
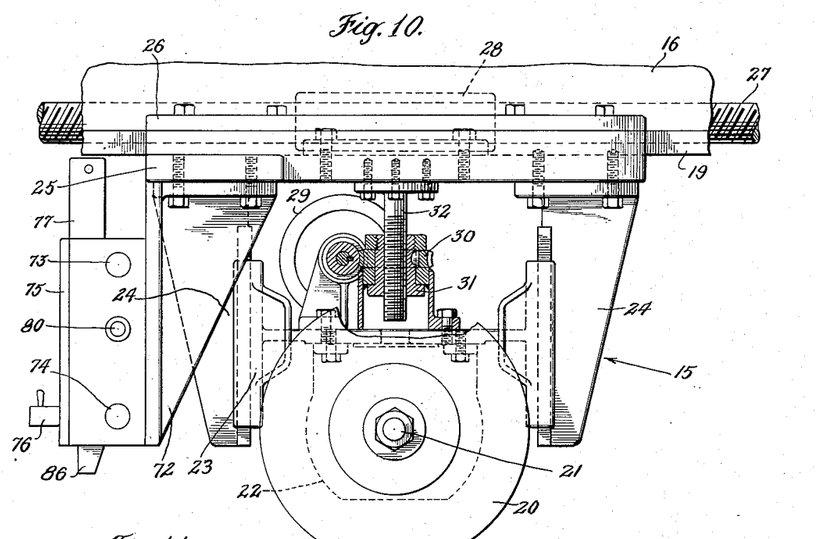
Figure 10 is an enlarged front elevational view of the saw unit assembly, certain of the parts being shown in section.

The details of the saw unit are more clearly shown in Figure 10 where it will be seen that the saw and motor are directly supported on frame 23. This frame in turn is supported on a pair of vertical guide members 24—24 in a fashion to permit raising or lowering the saw and motor unit for the purpose of controlling the depth of a cut. The vertical members 24 are in turn connected to the rail engaging frame 25 which is connected to the rails 19 by means of removable plate members 26 adapted to contact the upper surface of the rails 19 and provide for sliding support of the complete saw unit 15. Traversing motion of the saw unit is effected through the medium of lead screw 27 which engages the nut member 28 attached to the saw supporting structure 25.

In order to raise or lower the saw, mechanism is provided which is operated by means of handwheel 29. Rotation of the hand-wheel 29 actuates the worm wheel 30 which in turn rotates the nut 31. Nut 31 engages the vertical threaded rod 32 which is supported on the frame 25. Rotation of nut 31, therefore, causes movement of the frame 23 on which the saw is supported and permits adjustment of the saw elevation to the desired position.

Referring again to Figures 1 to 4, the work table 33 is formed in open frame or heavy grid construction in order to produce an accurate and rigid work surface while reducing the overall weight. A rearward extension to the work table in the form of members 34 provides for the support of a backstop structure, the stop member of which is shown at 35. The position of the backstop member may be adjusted from the front side of the machine so that an accurate setting may be made to determine the exact width of slab which is to be cut from the material on the table. A large sheet of heavy plastic material 36 is indicated in position on the work table 33. In the figures the backstop 35 is shown located to provide for positioning the plastic sheet during the sawing operation. Movement of the backstop 35 to the desired position is accomplished through the side members 37 which are rigidly attached to the backstop 35 and pivotally attached to a transverse frame member 38. Frame member 38 is supported by means of suitable threaded blocks 39 to screw rods 40 which are rotatably supported just below frame members 34. Chain and sprocket connections which are illustrated at 41 and 42 connect each of the screw members 40 with a rotatable operating rod 43 which runs to the forward part of the machine and on which the handwheel 44 is mounted. Thus, rotation of handwheel 44 causes rotation of the lead screws 40, thereby moving the backstop to the desired position. To provide accuracy of movement, silent type chain is preferably used and the tension of the chain is carefully adjusted to substantially eliminate back-lash thereby assuring that the motion of the two lead screws 40 is maintained exactly alike so that the backstop remains truly square with the table at every position of adjustment.

Figure 1:
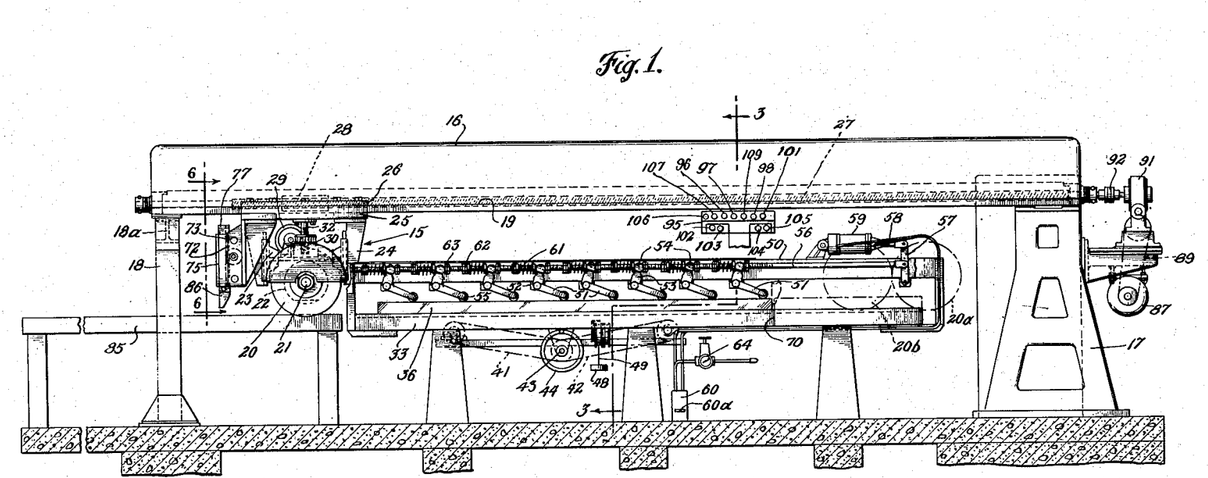
Figure 1 is a front elevation of a sawing machine according to the present invention.
Figure 2:
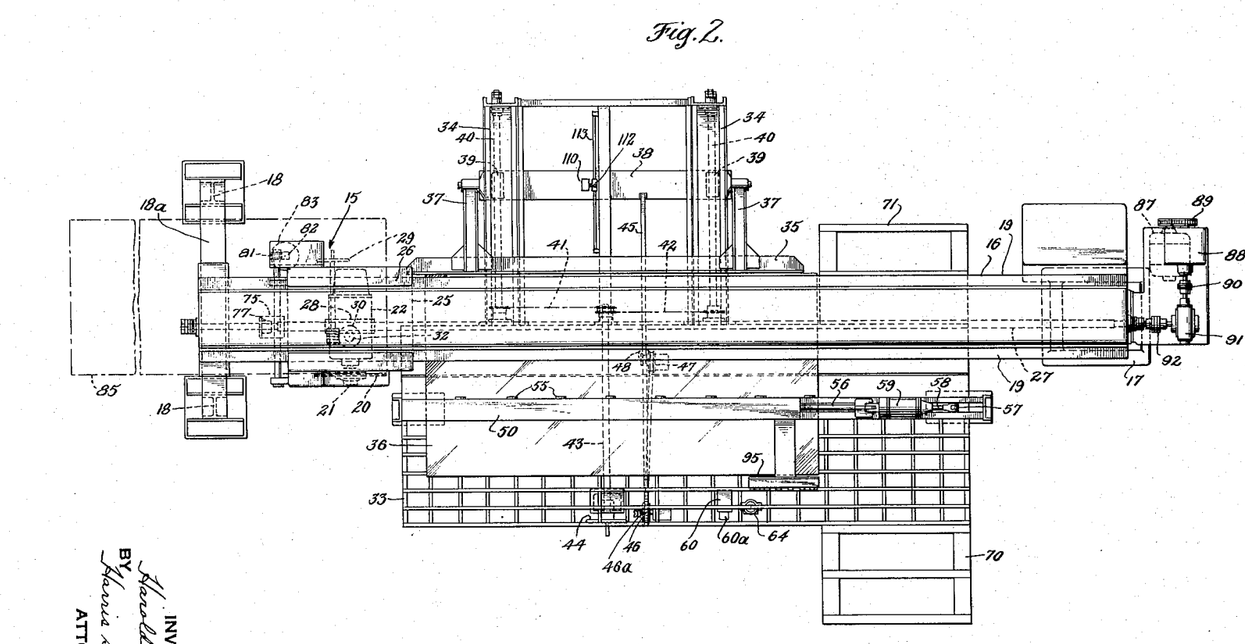
Figure 2 is a plan view of the machine illustrated in Figure 1.

In order to provide the operator with an instantaneous reading of the position of the backstop 35, a simple type of indicator is provided to show the distance of the backstop from the back face of the saw cut. The indicating mechanism incorporates a graduated flexible metal tape 45 which is attached to the member 38 to which the backstop 35 is connected. The flexible tape 45 passes over a drum or pulley 46 at the front of the table 33 near the handwheel 44 where it may be easily observed by the operator as the handwheel is adjusted. After passing around the pulley 46, tape 45 continues to the windup drum 47 which is located underneath the table 33. Tension is maintained in the tape 45 by means of weight 48 which is connected by cable 49 to a smaller diameter drum attached to drum 47. Thus, as the backstop is moved the tape 45 winds or unwinds on drum 47. Graduations on the tape give a direct reading at a point adjacent to pulley 46 to show the exact distance of the backstop behind the saw. An adjustable pointer or indicator 46a is mounted adjacent forward drum 46 to provide slab width reading for saw blades of different thickness.

Figure 3:
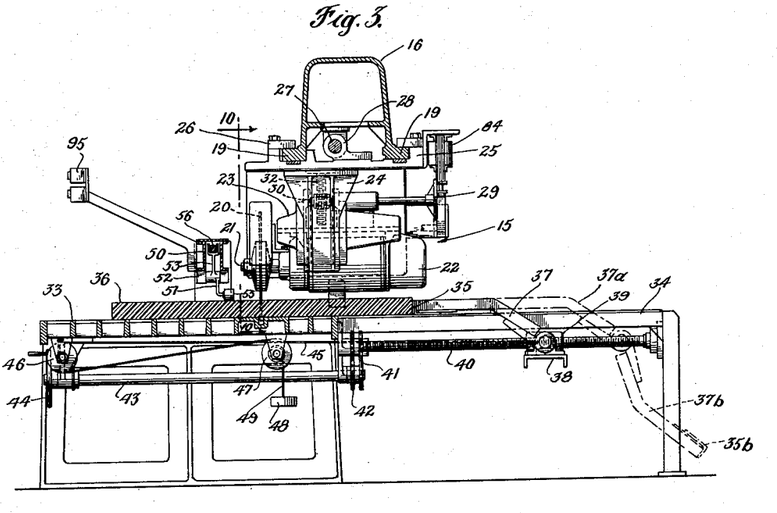
Figure 3 is a sectional view taken in the direction of arrows 3—3, Figure 1.
Figure 4:
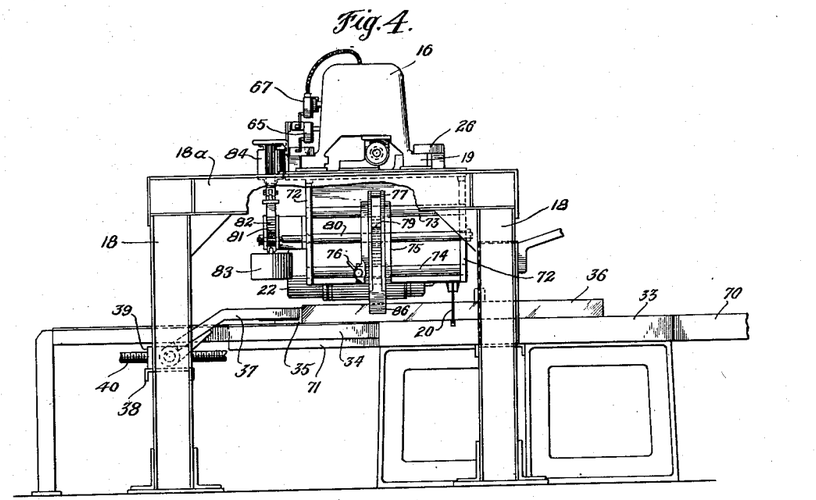
Figure 4 is an end elevational view of the machine looking from the left-hand end of Figures 1 and 2.

In case it should be desired to use the table 33 with the rearwardly extending frame work consisting of members 34 for supporting an unusually large piece of material for a special cutting operation, the backstop structure may be moved out of position to provide a clear unobstructed surface for supporting the material. In Figure 3, the manner in which the backstop may be moved out of position will be clear. Here it will be seen that the backstop is moved to a point near its rear position as indicated by dotted outline 37a. From this position the side frame members 37a together with the backstop proper 35 may swing down into the position indicated at 37b where the structure is out of the way and allows unobstructed use of the supporting members 34.

To hold the material being sawn and prevent it against accidental shifting once it has been positioned against the backstop, an improved type of clamping mechanism is provided. The general arrangement of this mechanism is clearly illustrated in Figures 1 and 3. In Figure 1 the front structural member of the clamp supporting beam has been shown removed to disclose the relative position of the various parts of the clamping mechanism. A beam structure 50 having front and rear members is used to support a plurality of moving clamping arms 51. The details of construction of the clamping arms and mounting are more clearly shown in Figures 11 and 12 where the parts are drawn to an enlarged scale. From Figures 1, 11 and 12 it will be seen that each clamping arm 51 is supported in bearing blocks 52 so that it may be pivotally moved. An upright arm 53 having a fork member 54 at its upper end is attached to the hub member of arm 51 in a fashion which permits it to transmit movement to the arm 51 for clamping purposes. A roller assembly 55 is attached to the lower end of arm 51, roller 55 preferably having a cover of firm rubber or plastic to prevent marring the surface of materials under clamping action. The clamping pressure is applied to the fork of each arm 53 by means of a rod 56 which runs longitudinally of the frame 50. As will be seen in Figure 1 the rod 56 is actuated by a lever 57 which is connected to the piston member 58 of an air cylinder 59. The air cylinder 59 is attached to the beam 50 and may be actuated in two directions through the medium of foot valve 60 located adjacent the normal operator's position at the front of the machine. Thus, the pedal 60a of foot valve 60 may be depressed to cause motion of the rod 56 to induce clamping action by swinging members 51 so that rollers 55 contact the work to be held. Valve 60 is of the type which is reversed at each movement of the control lever. To cause release of the clamping pressure, pedal 60a may be depressed again thereby reversing the air to cylinder 59 and moving the mechanism to raise the arms 51 out of effective position.

Figures 11, 12:
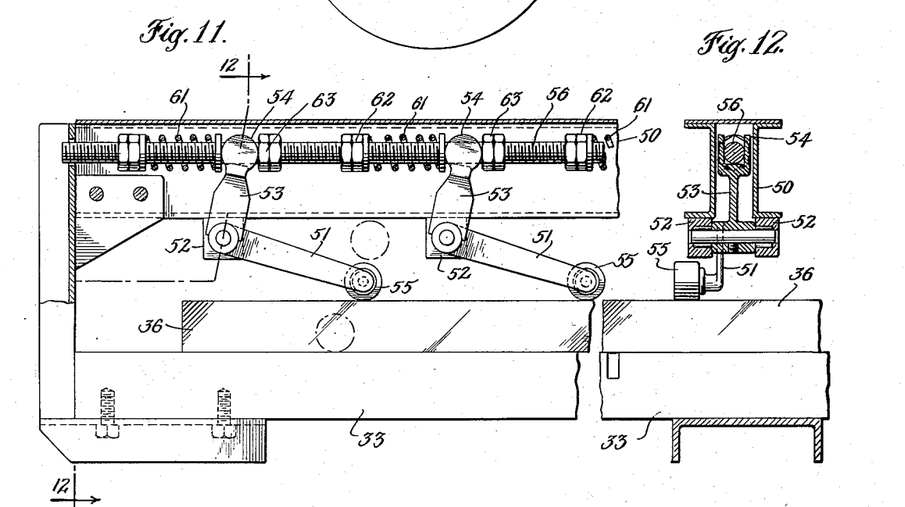
Figure 11 is a front elevational view of a portion of the clamping mechanism.
Figure 12 is a sectional view of the clamping mechanism taken in the direction of arrows 12—12, Figure 11.

In order to assure that even clamping pressure is produced at all points on the work being held in spite of inequalities in the thickness of the material, a special construction is used. In Figure 11 it will be observed that the pressure in the clamping direction is applied to the forks 54 through the medium of strong coil springs 61. Rod 56 is threaded to provide for use of adjusting nuts 62 and 63 for accurately positioning the clamp members 51 and also for providing the proper preload in the springs 61. Suitable lock nuts are used with nuts 62 and 63 to maintain the adjusted position. Springs 61 are provided with an initial compression which is slightly less than the average pressure which will be supplied to the clamping devices from the actuation of the air cylinder 59. The pressure to the air cylinder 59 is controlled through a regulator valve 64 so that the average clamping pressure may be predetermined to the desired amount. The use of individual spring pressure application in the fashion above described permits the springs to automatically adjust for unevenness in the surface of the material being clamped so that full clamping action is maintained at every roller 55.

Figure 5:
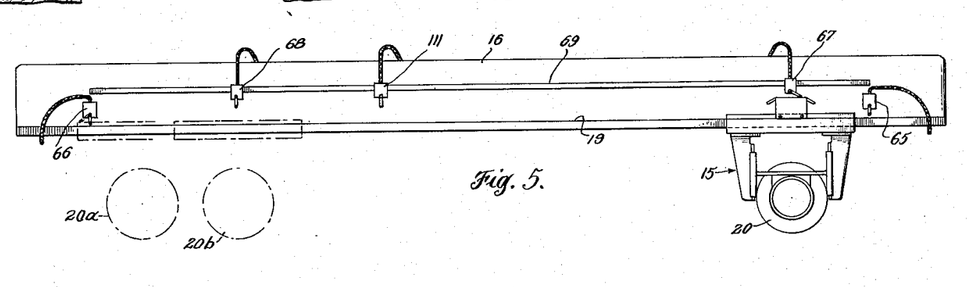
Figure 5 is a rear view of the supporting frame member showing the arrangement of limit switches mounted thereon.

In Figures 1, 2 and 5 it will be seen that the saw unit 15 may travel the complete length of the saw table 33. Thus the saw can move from the full line position indicated at 20 in Figure 1 to the extreme position indicated by dotted outline of saw 20a. Any intermediate position such as 20b may be selected as the range of traverse for a particular operation and a reversing switch which is adjustable in position will provide for stopping the saw travel at the desired point and reversing the controls for its return to the initial starting point. The limit switches are indicated in Figure 5 which shows the back face of the beam 16. Here the extreme limit switches 65 and 66 are shown in fixed position to prevent the possibility of the saw moving beyond the points corresponding to the positions of its switches. Adjustable limit switches 67 and 68 are provided to allow the saw travel to be selected for any desired range of motion within the extreme limits determined by switches 65 and 66. To quickly adjust for the desired saw traversing motion limit switches 67 and 68 may be moved along the rail 69 to any desired position and clamped to prevent accidental displacement.

From Figure 2 it will be observed that at one end of the work table 33 a forward extension 70 and a rearward extension 71 are provided. Normally the size of the material being cut is of such a length that it does not extend to this portion of the table, an example being illustrated by the plastic sheet 36 shown in position for cutting. After a long slab has been cut from the main piece of material it may be placed for cross cutting on the end portion of the table, the projections 70 and 71 serving to completely support the long narrow slab during the cross-cut operation. This cross-cut may be accomplished in the same cycle of saw movement by adjusting the saw limit switch at a point sufficient to include the cross-cut operation.

With the saw construction disclosed, mechanism is provided for automatically unloading the slab which is cut from the main work piece. The details of construction of this unloading mechanism are shown must clearly in Figures 1, 4, 6, 7, 8 and 9. The frame 72 for supporting the unloading mechanism is attached to the saw supporting frame 25 so that the complete unloading unit traverses with the saw carriage. Mounted in frame 72 are stationary rod members 73 and 74. A slidably mounted frame 75 is supported by rods 73 and 74 so that the frame 75 may be moved to any position, the extremes of which are determined by the sides of frame 72. A clamp device 76 provides for locking the frame 75 at any adjusted position.

Figure 6:
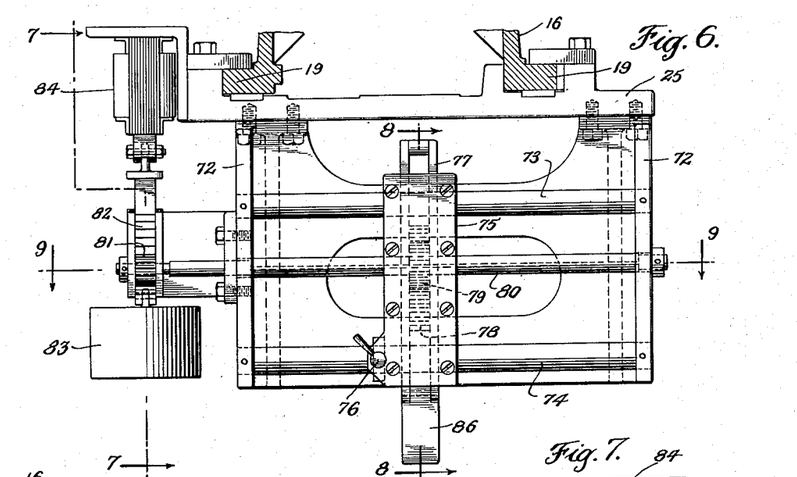
Figure 6 is an enlarged and elevational view of the unloading mechanism.
Figures 7, 8:
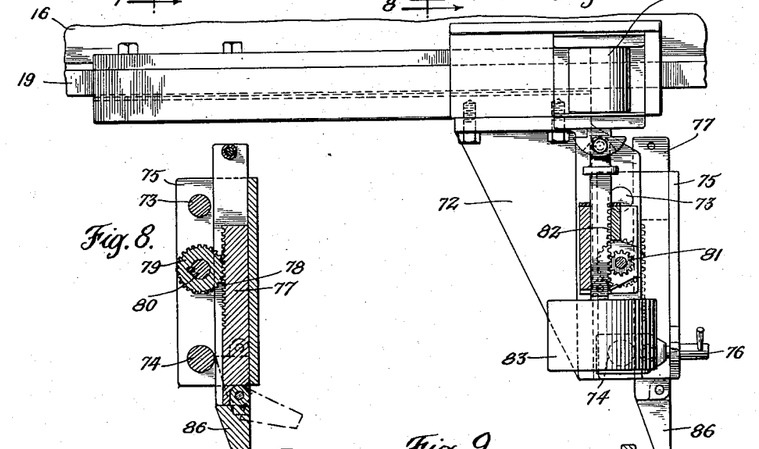
Figure 7 is a rear elevational view of the unloading mechanism with certain parts in section as indicated by the arrows 7—7, Figure 6.
Figure 8 is a vertical section of the unloading arm taken in the direction of arrows 8—8, Figure 6.
Figure 9:
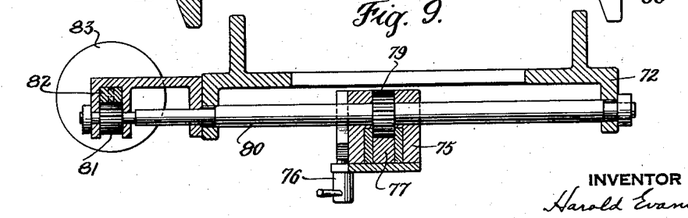
Figure 9 is a sectional view through the unloading mechanism taken in the direction of arrows 9—9, Figure 6.

A vertically movable member 77 is supported in the frame 75 and incorporates teeth 78 which are adapted to engage with gear 79. Gear 79 is keyed to rotatable shaft 80 which in turn is supported in frame 72. In order to raise and lower the member 77, another gear and rack structure illustrated at 81 and 82 is provided, vertical motion of the rack member 82 causing rotation of the gear 81 and thus raising and lowering of the member 77. Lowering of the rack member 82 causes raising of member 77 and vice versa. A weight 83 is attached to the lower end of rack member 82 and normally holds it in the down position to maintain the unloading member 77 in raised position since the weight 83 is selected to overcome the weight of the unloading member 77. In order to lower the member 77 into unloading position a solenoid unit 84 is connected to the upper end of the rack member 82 and when energized electrically, solenoid 84 serves to overcome the effect of the weight 83 and raise the rack member 82, thereby lowering the unloading member 77 to down position for unloading action.

When using the unloading device automatic means are provided to bring down the unloading member 77 only on the reverse movement of the cutting head and at a preselected position just in time to pick up the cut piece in front of the back stop, which is to be removed. An adjustable clamp switch 111 mounted on member 69, Figure 5, determines the exact position at which the unloading member 77 will be lowered to remove the cut piece or slab from the work table. This method permits pieces being cross cut at the right hand end of the table 33, Figure 2, to remain undisturbed by the unloading member because the unloading member remains up in the inoperative position until the solenoid 84, Figures 6 and 7, is actuated by the automatic closing of the clamp switch 111, Figure 5, at a position preselected by the operator. The location of the member 77 should be adjusted prior to use so that it is moved to proper position on rods 73 and 74 and clamped. The position to which the member 77 is moved is determined by the width of the slab which is to be unloaded, the member 77 preferably being positioned so that it is at the center of the end of the slab to apply a balanced pushing action during the unloading operation. When the member 77 is lowered it engages the end of the slab during the return traversing motion of the saw and automatically pushes the slab off the work table 33 on to the auxiliary table 85 or a suitable conveyor. The supporting structure with uprights 18 and beam 18a permits any suitable supporting table to be located at the end of the main table 33, thereby permitting unobstructed removal of the slab. When the saw is returned to the start position, the slab having been automatically removed, the material being sawn may be immediately moved to position against the backstop ready for the next cut. The fast-acting clamping mechanism eliminates any time loss in the positioning and preparation for the next operation.

The traversing motion of the saw unit 15 on the rails 19 is caused by the feed screw 27 and the engaging nut 28. These parts are clearly illustrated in Figures 3 and 10. In order to drive the screw 27 special mechanism is provided which is most clearly shown in Figures 1, 2 and 13. Here it will be seen that the feed screw 27 is driven from the electric motor 87 which drives hydraulic transmission 88 through the medium of belts 89. A driving coupling 90 connects the output shaft of the hydraulic transmission 88 to the input shaft of the speed reducer unit 91. The output shaft of the speed reducer 91 is in turn connected to the end of the screw 27 by means of coupling 92.

Figure 13:
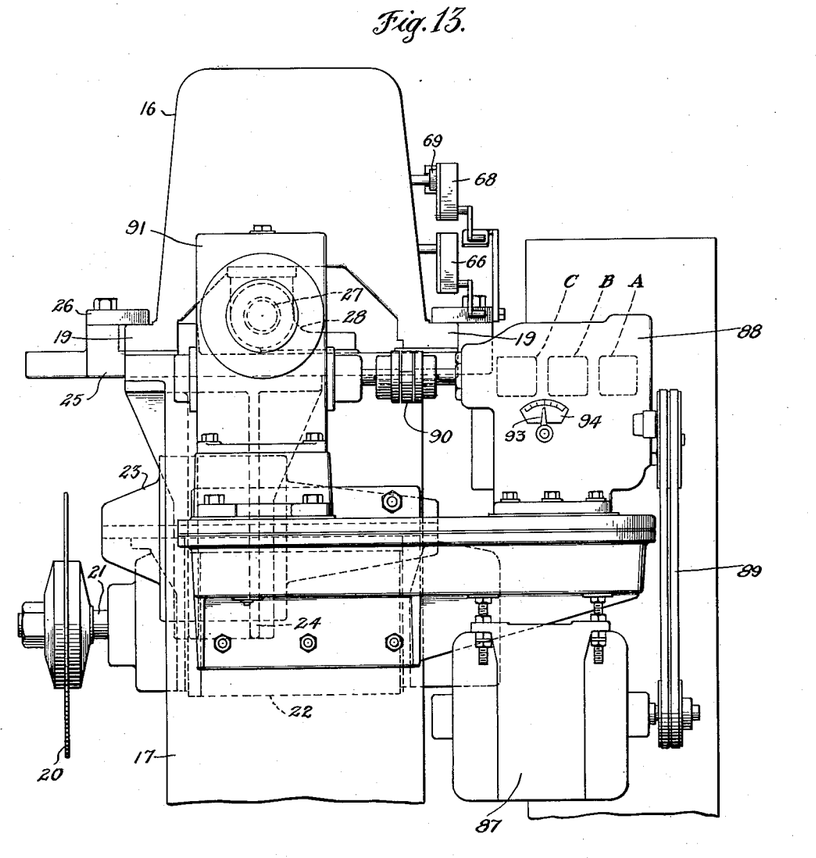
Figure 13 is an end elevational view looking from the right end of the machine and showing the arrangement of saw feed drive.

The rate of travel of the saw is controlled by means of the hydraulic transmission unit 88. This transmission incorporates hydraulic pump and motor mechanism of standard construction which permits the speed of the output shaft to be controlled through a large range of variation. Indicator 93 and dial 94 show the particular ratio at which the transmission is operating and movement of the indicator 93 to the desired ratio determines the normal traversing speed of the saw during cutting action.

However, as previously discussed, when bringing the saw up to cutting position or when returning the saw to starting position after the completion of a cut, it is desirable to have the traversing speed of the saw increased to maximum. Electrical controls for shifting the transmission speed to different preselected positions are provided to accomplish this increase in speed. The controls for the hydraulic motor include solenoids A, B and C which are illustrated in Figure 13 in dotted outline and which are shown diagrammatically in the wiring diagram in Figure 14.

Solenoids A, B and C are mechanically connected to actuate the transmission controls and are electrically operated in a fashion which permits the operator to bring the saw up to cutting position by pressing the jog switch located on the operator's switchboard 95 which is mounted in convenient position at the front of the machine over the work table. Pressing the jog forward switch 96 (see Figures 1 and 15) causes forward saw travel at the preselected speed. Pressing both jog forward and rapid jog switch 97 causes full speed forward operation of the feed screw 27. Release of these control buttons stops the forward motion of the saw. For normal single cycle operation the switch 98 which is used for selection of hand or automatic operation is left in "hand" position. Pressing forward button 106 causes the saw to travel forwardly at the particular cutting speed which had been preselected by the setting of indicator 93. After pressing button 106 the cycle of operation will continue until the saw reaches the point where the limit switch 68 is actuated to reverse direction of motion of the feed screw to return the saw. At the same time, the proper solenoid is energized to cause this operation to occur at high speed. When the saw returns to the position where limit switch 67 has been set the controls are automatically shut off and the saw remains at rest until the operator starts it on the next cycle. If reverse button 107 is pressed the motion is in the reverse direction and the cycle is completed when the saw carriage actuates switch 67.

If continued cycles of operation are desired the hand-automatic switch button 98 is moved to "automatic" position. This controls the circuits so that when the saw returns to starting position, that is, when it reaches switch 67, it automatically starts the next cycle at forward cutting speed and continues to make complete cycles of operation until shut off by the operator.

In some instances it may be desirable to operate the saw so that it moves at cutting speed both in the forward and rearward direction of motion such as when more than one pass is required to complete the cut. If operation in this manner is desired a suitable control switch located in the control box may be set by the operator to give reverse travel of the saw at the same speed as forward cutting speed. Stop button 101 permits the operator to stop the saw traversing motion at any point in the cycle. Pressing button 101 cuts off the power and requires that the operator initiate whatever traversing motion is desired by actuating the proper switch button.

Figures 14, 15:
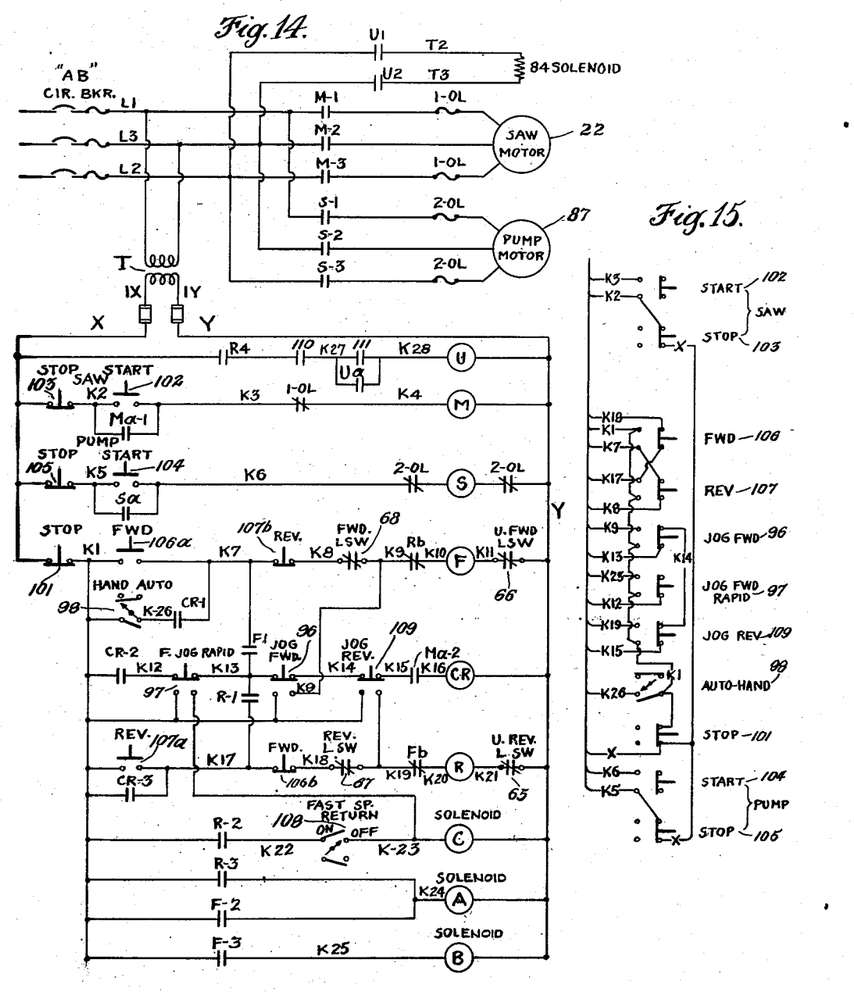
Figure 14 is an elementary wiring diagram for the electrical system controlling the machine.
Figure 15 is a diagram showing the electrical connections to the push button control panel.

The electrical wiring diagram, Figures 14 and 15, show how the controls for the saw operations are arranged to provide for the modes of operation described above. Figure 14 is the elementary controller diagram, while Figure 15 shows the actual electrical connections for the control panel push buttons and switches. The saw motor 22 and the control pump motor 87 are connected into the supply lines by means of circuit breakers marked "AB," which are manually operated and remain in closed position as long as the equipment is in use. The saw motor may be started by pressing the saw start switch 102 which actuates the magnetic linestarter M, there being overload relays marked 1–OL associated with this circuit. Stopping of the saw is accomplished by means of pressing the stop button 103 which interrupts the circuit to the saw and releases the magnetic linestarter M. Relays M1, M2 and M3 are controlled by linestarter M.

In the controller diagram, Figure 14, a control transformer T provides 110 volt current for the push button control station, the solenoid operated relays, magnetic contactors and the solenoid valves of the system.

The pump motor 87, which provides the power for traversing movement of the saw, is operated through the pump start switch 104 and the pump stop switch 105, which actuate the magnetic linestarter S in a fashion similar to that described above for the saw motor. It will be noted that contactors Ma–1 and Sa provide holding circuits for the saw and pump motors respectively.

In the controller diagram (Figure 14) a solenoid operated magnetic relay marked "F" controls the forward direction operation of the saw. This relay controls contactors F1, F2, F3 and Fb. Another solenoid operated magnetic relay R controls the reverse direction operation of the saw. This relay controls auxiliary contactors R1, R2, R3, R4 and Rb. A third auxiliary relay CR actuates contactors CR1, CR2 and CR3 thereby providing holding circuits for saw movement and controlling the operation cycle.

The three solenoids marked A, B and C which control the valves for the hydraulic feed motor 88 are shown in Figure 14. Solenoid A determines the on-off operation of feed movement. Solenoid B determines the direction of feed movement. Solenoid C determines the speed of feed movement.

The hand-automatic switch is shown at 98. This is a two-position switch which may be set for either hand operation or automatic operation, as previously described. This switch is normally retained in the hand position when the saw is being used for single cycle operation.

In diagram Figure 14 the forward switch 106 is illustrated as two switches 106a and 106b to indicate that when switch 106 is pressed it causes the closing of one circuit and the opening of another. Thus, depressing the forward switch 106 will energize the forward direction contactor F which energizes solenoids A and B by means of contactors F2 and F3, causing the feed mechanism to run at the preselected speed in the forward direction. Closing of relay F closes contactor F1 which provides a circuit to relay CR which operates contactors CR1, CR2 and CR3. Contactors CR2 and F1 thus provide a holding circuit for relay F. Contactor CR1 is ineffective while the automatic switch 98 is open. Contactor CR3 cannot complete the circuit for relay R because contactor Fb is open when relay F is closed. It should be noted that contactor Ma-2 permits relay CR to be energized only when relay M is closed and the saw motor is running. Thus there are holding circuits for saw traversing only when the saw is rotating.

After being started the feed mechanism operates until the forward limit switch 68 is actuated to stop the forward motion by interrupting the circuit to relay F which causes opening of contactors F1, F2 and F3 and closing of contactor Fb. Since contactor CR3 is closed, the closing of contactor Fb energizes relay R which in turn energizes contactors R1, R2, R3 and R4 while opening contactor Rb. Contactor CR3 provides the holding circuit for relay R and reverse operation is initiated. Reverse motion continues until the reverse limit switch 67 is opened to stop traversing motion. The carriage may also be operated in the reverse direction from any position by pressing the reverse switch 107. In Figure 14 the reverse switch is also indicated as two separate switches 107a and 107b to illustrate that in depressed position the circuit is broken to the forward direction relay F and completed for the reverse direction relay R. Contactor R1 energizes relay CR. Solenoid C is energized through contactor R2 during the reverse operation to provide high speed return motion of the saw carriage. However, should normal cutting speed return motion be desired the fast speed return action may be eliminated by opening the switch 108 to eliminate the effect of R2 and provide return at the preselected speed. Switch 108 may be located in the control box as it is used infrequently.

When continued cycles of operation are desired the switch 98 is moved to automatic position which makes contactor CR1 effective. Thus, upon pushing button 106, circuits are established for both forward relay F and reverse relay R so that forward and rearward carriage motion continues automatically through the action of contactors Fb and Rb. This continues until the stop switch 101 is actuated to open relays F, R and CR.

When it is desired to move the saw position manually from one point to another for such purposes as bringing it into position for the beginning of a cut, the jog forward switch 96 is pushed. This causes forward motion of the carriage at the preselected speed. If more rapid advance is desired the jog forward rapid switch 97 is also depressed along with switch 96. As will be seen from Figure 14 this energizes solenoid C circuit to cause high speed operation. Reverse jog movement may be similarly obtained by pressing jog reverse switch 109. Motion of the carriage ceases upon release of the forward or reverse jog switch.

The unloader device is automatically actuated on the return stroke of the cutting head or carriage unit 15 when it contacts the adjustable clamp switch 111. The circuit feeding the solenoid which operates the unloader relay U is fed through contactor R4 in the reverse relay, thus insuring operation only when the head is in reverse. Also in series in the unloader relay circuit is the safety switch 110. This safety switch is mounted on member 38 of the adjustable back stop. This switch is a normally open type and is brought into the closed position by adjusting into contact with switch 110 an adjustable cam 112. This arrangement results in the switch 110 returning to the normally open position if member 38, on which it is mounted, moves as a result of the operator changing the adjustment of the back stop. With this switch in the open position the unloader is inoperative, thus preventing damage which might result if the operator adjusted the back stop without also resetting the position of the unloader arm to the center of the piece to be removed.

When the operator adjusts the unloader arm after moving the back stop he must reset the cam 112 on its slide 113, so as to again bring switch 110 into the normally closed position.

With the controls thus provided, the machine can proceed to cut a long strip off slab 36 on the table and proceed forwardly to cut off several pieces laid lengthwise on table extensions 70 and 71 at the right hand end of table 33, Figure 2. When the cutting head has completed the stroke and is reversed by actuating limit switch 68 the position of clamp switch 111 can be so arranged that the unloader will pass over the piece, or pieces, being cross cut and be actuated to plunge down and remove from the machine only the piece that has been longitudinally cut. When clamp switch 111 closes the circuit to relay U, a holding circuit is established through contactor Ua and the solenoid 84 is energized through contactors U1 and U2 to hold it in operative position until the end of the reverse stroke, when reverse limit switch 67 causes opening of relay R and contactor R4.

The connecting conductors are identified at K1, K2, K3, etc. in Figure 14 and in Figure 15 the various connections K1, K2, K3, etc., for the push buttons are illustrated arranged in a suitable fashion for the control board. The relationship of the buttons will also be seen in the push button station 95 illustrated in Figure 1.

From the foregoing, it will be evident that I have provided an improved saw construction and control therefor. The saw construction incorporating the automatic unloading device provides distinct advantages in reducing the handling required and increasing the production speed. The open end structure allows removal of the sawn slabs in a direct fashion while providing rigid support for the saw unit. The unique adjustment of the unloading mechanism allows for handling of all normal widths of slabs. Adjustment for the width of cut may be quickly accomplished by the improved backstop which may be accurately set to the desired width from the front side of the work table adjacent the control panel. The backstop mechanism may be swung clear of the table for special operations. The fast-acting clamping mechanism is also controlled from the front position and provides for evenly distributed clamping of any thickness of material through the action of air pressure coupled with equalizer springs. The control system with its central push button control panel provides for instant response of the equipment to the operator's desires. Hand control through jog switches, automatic single cycle operation or automatic continuous cycles of operation may be instituted at any instant. The rugged adjustable limit switches provide for any desired length of stroke in any portion of the travel while the ultimate limit switches prevent the possibility of overrun on the lead screws. These improvements combine to increase the production of fabricated slabs from the machine by increasing the proportion of time which the machine is actually engaged in cutting operations. In addition, labor involved in handling is reduced and adequate time is provided to permit the operator to perform secondary operations such as moving the cut slab from the unloaded position to a position on the machine suitable for cross-cut operations.

I claim:

1. For a sawing machine suitable for cutting materials such as stone and plastic, a beam structure, a saw carriage slidably supported on said structure, mechanism for causing traversing motion of said saw carriage on said beam structure, said mechanism including a feed screw, a hydraulic transmission, a control for said transmission which may be set to provide different selected speeds for forward traversing movement of said carriage, automatic controls for reversing said transmission and for increasing the transmission speed for the return traversing movement of the saw carriage, said automatic controls including a solenoid for controlling the reverse operation of said hydraulic transmission, an electrical limit switch and circuit for controlling said solenoid, a second solenoid to change the output speed of said hydraulic transmission and an electrical circuit for said second solenoid interconnected with the reversing solenoid circuit.

2. Sawing machine structure and mechanism incorporating a main beam, a powered saw unit mounted on said beam for longitudinal movement with respect thereto, a drive system for causing movement of said saw unit including a hydraulic transmission having an output shaft the speed of which may be varied over a wide range, control mechanism for said transmission including an electrical limit switch, a solenoid for altering the speed for said hydraulic transmission, a solenoid for reversing the direction of operation, electrical connections between said limit switch and said solenoids to cause their operation for changing the output speed of said transmission and reversing the direction of operation when said saw unit moves to the position where said limit switch is actuated.

3. For a machine construction suitable for cutting material such as stone and plastic, a saw unit adapted to move with respect to the work being sawed, said saw unit being mounted upon a track structure, actuating mechanism for moving said saw unit including a transmission incorporating a variable speed unit, controls for said variable speed unit having a selector device for presetting the speed of motion of said saw unit for cutting purposes, a solenoid adjacent said selector device, electrical controls including a switch located near the operator's position, said switch being connected to actuate said solenoid to provide for a speed of travel faster than the preset speed of said saw unit when the switch is actuated by the operator.

4. For a sawing machine suitable for use in cutting such materials as stone and plastic, a beam structure, a saw unit slidably mounted on said structure, transmission mechanism for causing motion of said saw unit on said structure including a variable speed unit having an adjustable control, electrical controls for actuating said variable speed unit in a fashion to permit the operator to cause increased speed of travel as compared to the preset cutting speed, said electrical controls including two hold-down switches one of which is connected to provide for operation at an intermediate forward speed and the other of which is interconnected with the first switch in a fashion which provides for full speed forward motion when both switches are pressed.

5. Saw mechanism for use in cutting materials such as stone and plastic including a main supporting structure, a saw unit having a carriage connected to said supporting structure for traversing movement, slab unloading mechanism mounted on said carriage, said unloading mechanism including a part which may be moved to clear the work being cut when said carriage is traveling in the cutting direction and which may be moved to contact the material cut from the main piece of work and move it upon travel of the carriage in the reverse direction.

6. For a stone and plastic cutting machine, a frame structure having a main supporting beam, a saw unit mounted on said beam for movement longitudinally thereof, a work table supporting the material to be sawn, unloading mechanism attached to said saw unit and having a contacting member which may be raised and lowered, said member being in the raised position when the saw unit is traveling along said beam in the direction of cutting action, a control member which may be operated to cause lowering of said contacting member to a position where it may contact a slab which has been sawn from the main piece of work whereby said slab may be pushed from the work table during the return movement of the saw unit along said beam.

7. For a machine suitable for cutting stone or plastic materials, a traversing saw carriage adapted to move the saw during the cutting action, an unloading device associated with said saw carriage, said device having a part which may be moved to allow it to be clear of the work during the cutting motion of the saw and which may be moved to contact the work which has been sawn from the main piece for unloading purposes during the return stroke of the saw, said part being arranged for transverse adjustment to allow it to be set to accommodate slabs of different widths.

8. A machine for cutting stone and plastic material including a main beam, a work table extending underneath said beam, a saw unit having a carriage supported on said beam for movement along it for cutting purposes, an unloading mechanism supported on said carriage, said mechanism incorporating a member which may be controllably raised or lowered to either clear work being sawn or to contact the end of a slab which has been removed from the work, said mechanism having a weight mechanically interconnected with said member for retaining it in raised position and an electrically controlled unit for overcoming the effect of said weight and causing lowering of said member for purposes of removing the slab from said table during reverse operation of said carriage.

9. For a machine suitable for cutting stone and plastic material, a movable carriage supporting a saw unit, unloading mechanism supported on said carriage, said mechanism including a member which may be moved into or out of position for engaging a slab of the material being cut, a device for causing reversal of movement of the carriage, actuation of said device also causing operation of said member to move it into position for contacting the work for unloading purposes.

10. For a machine suitable for cutting stone and plastic material, a work table, a saw unit supported above said work table and arranged for movement with respect to said table for cutting purposes, a backstop member located parallel to the direction of travel of said saw unit, said backstop having adjustment mechanism for moving it in a direction transverse to said saw movement, said mechanism incorporating double screw members located in the transverse direction, side members connecting the backstop member to said screws, hand-controlled mechanism operable from the forward side of said table adapted to actuate said screw members for adjusting the position of said backstop.

11. For a machine suitable for cutting stone and plastic material, a work table, a saw unit supported above said work table and arranged for movement with respect to said table for cutting purposes, a backstop member located parallel to the direction of travel of said saw unit, said backstop having adjustment mechanism for moving it in a direction transverse to said saw movement, said mechanism incorporating double screw members located in the transverse direction, side members connecting the backstop member to said screws, hand-controlled mechanism operable from the forward side of said table adapted to actuate said screw members for adjusting the position of said backstop, pivot members for attaching said side members to said screws thereby permitting the backstop to be swung out of position below the surface of said table.

12. For a sawing machine, a work table, a beam member supported above said table, a saw unit mounted on said beam for traversing movement during cutting, a backstop located at the rear side of said table, supporting and operating structure for said backstop including two transverse frame members located to provide an extension of the work table surface, a lead screw supported below each of said transverse members, a block device fitted to each of said lead screws, a pair of side members attached to said backstop, said side members being pivotally attached to said block devices, a hand control at the forward side of said table, said control being connected for operation of said lead screws.

13. For a traversing cutting saw, a gauge member located behind said saw for determining the width of material being sawn, adjustable mechanism for moving said member in a direction transverse to the direction of the saw motion, said adjustment mechanism including a pair of lead screws mounted transverse to the direction of saw travel, said lead screws being actuable by a hand control mounted at the forward side of said saw, a shaft leading from said hand control, chain and sprocket mechanism interconnecting said shaft with each of said lead screws.

14. For a machine suitable for cutting stone or plastic material, a saw unit mounted for straight line cutting motion, a backstop having mechanism for causing adjustment in a direction transverse to the direction of cutting motion, a control member at the front of said work table for adjusting the position of said backstop with respect to said saw unit, a backstop position indicator including a flexible metal scale having one end attached to a moving portion of the backstop mechanism, a pulley mounted at the forward portion of said work table, said metal scale being arranged to pass over said pulley, a tightening device attached to said scale and an indicator for reading the position of said backstop from said scale.

15. For a sawing machine, a work table, clamping mechanism for retaining the work in position on said table during a cutting operation, said clamping mechanism including a beam structure, a plurality of bellcranks pivotally supported on said beam, a rod member running longitudinally with respect to said beam, spaced abutments on said rod member adapted to transmit force from said rod member to one of the arms of each of the bellcranks, a power cylinder connected to one end of said rod member for causing longitudinal movement thereof, thereby moving said bellcranks into clamping position.

16. Clamping mechanism for holding work during a sawing operation, said mechanism incorporating a beam structure, a plurality of bellcranks each having a generally upright arm and a generally horizontal arm, each of said bellcranks being pivotally attached to said beam structure, a longitudinally disposed actuating rod having a plurality of spaced abutments including for each bellcrank an abutment located to act as a limit stop for the bellcrank in one direction, and another abutment at the opposite side of said bellcrank for transmitting a clamping pressure from said rod to said bellcrank, a resilient member mounted between the end of said second abutment and the arm of said bellcrank, said resilient member having an initial preload.

17. Clamping mechanism for holding work on a sawing machine, said mechanism incorporating a plurality of clamping devices each having a pair of arms, a beam to which said devices are pivoted, an actuating rod mounted longitudinally with respect to said beam, said rod being threaded throughout a major portion of its length, abutment members mounted on said rod for acting as limit stops and for applying the clamping pressure to the arms of said devices, said abutment members being in the form of adjustable nuts mounted on said threaded rod.

18. A sawing machine having a work table, a clamping device supported above said table, said device having a longitudinal frame member and incorporating a series of bellcranks pivotally mounted thereon, each of said bellcranks having a generally upright arm and a generally horizontally extended arm, each of said extended arms having a roller at the end thereof, and operating mechanism for moving said bellcranks to cause said extended arms and rollers to lower for clamping purposes.

19. A sawing machine for materials such as stone and plastic including a traversing saw carriage, an unloading mechanism supported on said carriage, said mechanism incorporating a member which may be raised to clear work being sawn or which may be lowered to engage a sawn slab, a device for retaining said member in raised position and a control for lowering said member for unloading purposes.

20. A machine suitable for cutting stone or plastic materials, including a traversing saw carriage, a work table on which material being sawn is supported, an unloading device associated with said saw carriage for removing a slab after it has been sawn, said device having a part which may be raised to clear the work during the cutting motion and lowered to contact the slab for removal on the return stroke of the carriage, said device having a horizontally disposed shaft adapted to rotate for purposes of raising and lowering the slab contacting part, a second part attached to said shaft to provide for adjustment of the transverse position of said slab contacting part while retaining operational contact with said shaft for rotational purposes.

21. A machine unit suitable for cutting materials such as stone and hard plastic, a traversing saw carriage, a work table, an unloading device mounted for movement with said saw carriage, said device having a part which may be lowered to engage a slab for removal on the return stroke of the carriage, a control system for lowering said part including an electrical circuit having a movable switch unit for determining the position at which said part is lowered and a contactor which permits lowering only during reverse operation of the carriage.

22. A machine unit suitable for cutting materials such as stone and hard plastic, a traversing saw carriage, a work table, an unloading device mounted for movement with said saw carriage, said device having a part which may be lowered to engage a slab for removal on the return stroke of the carriage, adjustable back square mechanism for determining the width of cut, a control system for lowering said part including an electrical circuit having a movable switch unit for determining the position at which said part is lowered and a contactor which permits lowering only during reverse operation of the carriage, said circuit also having an additional switch associated with said back square mechanism, and adjustable resetting means for closing said switch in any position of the back square mechanism.

HAROLD EVANS.

References Cited in the file of this patent

UNITED STATES PATENTS

| Number | Name | Date |
|---|---|---|
| 555,611 | Mills | Mar. 3, 1896 |
| 888,732 | Pierce | May 26, 1908 |
| 896,782 | Wegner et al. | Aug. 25, 1908 |
| 1,017,784 | Meyers | Feb. 20, 1912 |
| 1,097,034 | Lautz | May 19, 1914 |
| 1,149,533 | Patch | Aug. 10, 1915 |
| 1,902,279 | Evans | Mar. 21, 1933 |
| 1,906,739 | Carruthers | May 2, 1933 |
| 2,488,643 | Smith | Nov. 22, 1949 |